United States Patent
Koss et al.

(10) Patent No.: US 10,097,619 B2
(45) Date of Patent: Oct. 9, 2018

(54) CROSS-DEVICE NOTIFICATIONS

(71) Applicant: Google Inc., Mountain View, CA (US)

(72) Inventors: Michael Campbell Koss, Hunts Point, WA (US); Justin DeWitt, Kirkland, WA (US); Katie Jane Messerly, Seattle, WA (US); Dmitry Titov, Redmond, WA (US)

(73) Assignee: Google LLC, Mountain View, CA (US)

( * ) Notice: Subject to any disclaimer, the term of this patent is extended or adjusted under 35 U.S.C. 154(b) by 285 days.

(21) Appl. No.: 14/658,005

(22) Filed: Mar. 13, 2015

(65) Prior Publication Data

US 2015/0373089 A1 Dec. 24, 2015

Related U.S. Application Data

(60) Provisional application No. 62/016,594, filed on Jun. 24, 2014.

(51) Int. Cl.
| | | |
|---|---|---|
| G06F 15/16 | (2006.01) | |
| H04L 29/08 | (2006.01) | |
| H04W 12/08 | (2009.01) | |

(52) U.S. Cl.
CPC .......... *H04L 67/10* (2013.01); *H04W 12/08* (2013.01)

(58) Field of Classification Search
CPC ......... H04L 67/10; H04L 51/12; H04L 51/14; H04L 51/16; H04L 51/18; H04W 12/08
See application file for complete search history.

(56) References Cited

U.S. PATENT DOCUMENTS

| | | |
|---|---|---|
| 8,145,718 B1 | 3/2012 | Kacker et al. |
| 9,350,693 B2 * | 5/2016 | Buck ........................ H04L 51/24 |
| 9,679,075 B1 * | 6/2017 | Kolam .............. G06F 17/30896 |

(Continued)

FOREIGN PATENT DOCUMENTS

| | | |
|---|---|---|
| JP | 2003-283693 A | 10/2003 |
| JP | 2004-005170 A | 1/2004 |

(Continued)

OTHER PUBLICATIONS

International Preliminary Report on Patentability dated Dec. 27, 2016, which issued in International Application No. PCT/US2015/036042.

(Continued)

*Primary Examiner* — Jonathan A Bui
(74) *Attorney, Agent, or Firm* — McDermott Will & Emery LLP

(57) ABSTRACT

Techniques for cross-device notifications are provided. An example method includes receiving a first indication of an event detected at a first device associated with a user account, determining one or more characteristics of the event based on the first indication of the event, detecting whether the determined characteristics match at least one selection criterion, automatically identifying a second device from one or more devices associated with the user account, and providing, if the determined characteristics match the at least one selection criterion, the first indication of the event to the second device associated with the user account, where the provided first indication of the event is displayed at the second device to allow management of the event at the first device from the second device.

22 Claims, 8 Drawing Sheets

(56) References Cited

U.S. PATENT DOCUMENTS

| | | | |
|---|---|---|---|
| 2006/0133590 A1 | 6/2006 | Jiang | |
| 2007/0233790 A1 | 10/2007 | Agarwal et al. | |
| 2008/0268867 A1 | 10/2008 | Cadenas | |
| 2009/0191849 A1* | 7/2009 | Fioretti | H04L 12/5855 455/412.2 |
| 2010/0048182 A1 | 2/2010 | Ben-David et al. | |
| 2012/0100838 A1* | 4/2012 | Kieser | G06F 17/30887 455/414.4 |
| 2013/0288654 A1* | 10/2013 | Jeon | H04W 4/16 455/417 |
| 2014/0074927 A1* | 3/2014 | Rodriguez | G06F 17/30902 709/204 |
| 2014/0302833 A1* | 10/2014 | Jin | H04W 4/16 455/417 |
| 2014/0365569 A1* | 12/2014 | Vyrros | H04L 51/00 709/204 |
| 2015/0350146 A1* | 12/2015 | Cary | H04W 4/22 709/206 |

FOREIGN PATENT DOCUMENTS

| | | |
|---|---|---|
| JP | 2006-507771 A | 3/2006 |
| JP | 2006-319946 A | 11/2006 |
| JP | 2010-154280 A | 7/2010 |
| JP | 2013-513178 A | 4/2013 |
| KR | 10-2007-0060177 A | 6/2007 |
| WO | WO-2004/049132 A2 | 6/2004 |
| WO | WO 2004049132 A2 * 6/2004 ........ H04M 3/42263 |
| WO | WO-2014/012186 A1 | 1/2014 |
| WO | WO-2014/059608 A1 | 4/2014 |

OTHER PUBLICATIONS

"Pushbullet—Your devices working better together," https://www.pushbullet.com/, retrieved Mar. 5, 2015.

Australian Examination Report from Australian Patent Application No. 2015280414, dated Jul. 11, 2017, 3 pages.

Extended European Search Report from European Patent Application No. 15811850.5, dated Feb. 22, 2018, 8 pages.

Japanese Office Action from Japanese Patent Application No. 2016-575096, dated Nov. 28, 2017, 7 pages.

Notice of Acceptance from Australian Patent Application No. 2015280414, dated Dec. 5, 2017, 3 pages.

* cited by examiner

CROSS-DEVICE NOTIFICATIONS

CROSS-REFERENCE TO RELATED APPLICATION

The present application is a non-provisional of U.S. Patent Application Ser. No. 62/016,594 entitled "Cross-Device Notifications," filed on Jun. 24, 2014, the disclosure of which is hereby incorporated by reference in its entirety for all purposes.

BACKGROUND

The present disclosure relates generally to computing devices, such as mobile and desktop devices, and particularly to display of notifications on such devices. Users are increasingly acquiring and using multiple computing devices. For example, a user may use a smartphone, tablet and a laptop computer.

SUMMARY

The disclosed subject matter relates to cross-device notifications.

In some innovative implementations, the disclosed subject matter can be embodied in a method. The method comprises receiving a first indication of an event detected at a first device associated with a user account, determining one or more characteristics of the event based on the first indication of the event, detecting whether the determined characteristics match at least one selection criterion, automatically identifying a second device from one or more devices associated with the user account, and providing, if the determined characteristics match the at least one selection criterion, the first indication of the event to the second device associated with the user account, where the provided first indication of the event is displayed at the second device to allow management of the event at the first device from the second device.

In some innovative implementations, the disclosed subject matter can be embodied in a machine readable medium. The machine readable medium includes instructions, which when executed by a processor, cause the processor to perform operations comprising detecting an event at a first device associated with a user account, providing a first indication of the event to a server, where when characteristics of the detected event match at least one selection criterion, the server provides the first indication of the event to a second device associated with the user account, receiving a second indication including an action that is to be performed with respect to the event detected at the first device, the second indication generated upon an interaction with the displayed first indication of the event at the second device, and managing the event at the first device based on the action.

In some innovative implementations, the disclosed subject matter can be embodied in a system. The system comprises a memory comprising instructions and a processor configured to execute the instructions to receive a first indication of an event detected at a first device associated with a user account, determine one or more characteristics of the event based on the first indication of the event, detecting whether the determined characteristics match at least one selection criterion, automatically identify one or more devices associated with the user account, and broadcast the first indication of the event, if the determined characteristics match the at least one selection criterion, to the one or more devices associated with the user account, where the provided first indication of the event is simultaneously displayed, in real time, at the one or more devices to allow management of the event at the first device from any of the one or more second devices.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

Figure 1:
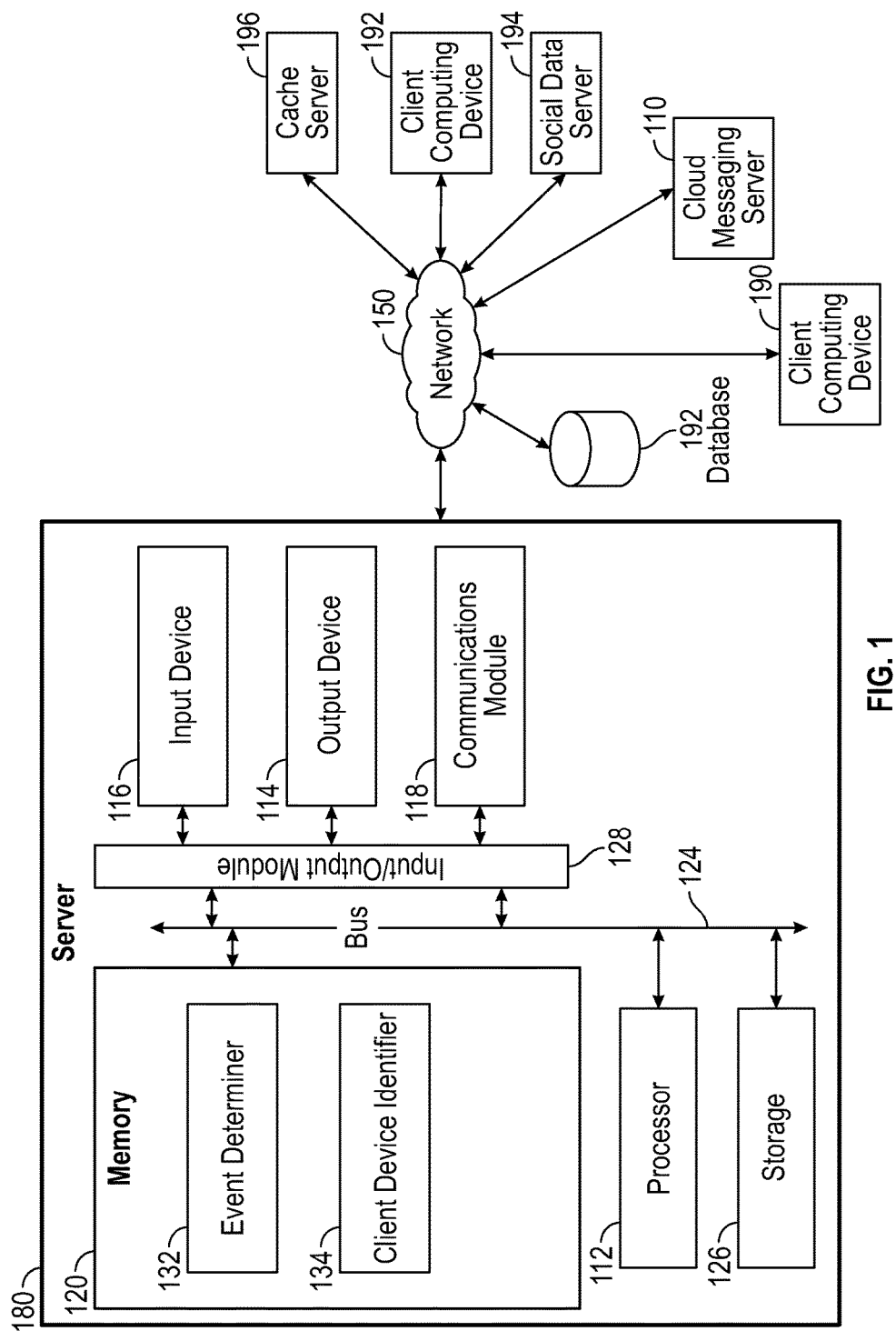
FIG. 1 is a diagram of an example device and network environment suitable for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

Users may often use multiple computing devices. These devices include smartphones, tablet computers, desktop computers, smart-watches and any other computing devices. An event may occur at a computing device (e.g., smartphone) when the user is away from the computing device. In this case, the user may miss the event and may later become aware that the event occurred when the user is near the computing device. For example, a phone call may be received at the user's smartphone at home when the user is at a business location and interacting with a desktop computer. In this scenario, the user may not be aware that the smartphone is ringing or is currently receiving a call. As a result, the user may miss, for example, a time sensitive phone call that may require the user's immediate attention. Furthermore, the smartphone may continue to audibly ring or vibrate inconveniencing other individuals located near the phone. In another example, the smartphone may be located in the user's purse or pocket while the user may be interacting and giving primary attention to another device. When a notification (e.g., phone call or message) is received at the smartphone in the user's pocket or purse, the user may need to change focus from the other device to pull out the smartphone and view the message or notification. Thus, the user's attention to a particular task may be interrupted. In another example scenario, a messaging service message (e.g., short message) may be received at the user's smartphone while the user is away from the smartphone. In this scenario, the user may be unaware that the message has been received and may not be able to respond to the message until the user is physically present near the smartphone and is able to use the smartphone. In yet another example scenario, the user may be frequently travelling between different locations and the user may be using any device that is available for use to the user at the locations. Again, the user may miss a message that has been sent to a particular device of the different devices because the user is not near and able to use the particular device and is instead using a different device. In the example scenarios noted above, user experience is degraded.

In some implementations, a first indication of an event detected at a first device associated with a user account may be received at a server. In one example, the first device may be associated with the user account when the user may sign in or log into the device with user credentials that may include a username and a password. In another example, the first device may be associated with the user account when the user signs or logs into an application instantiated at the first device. In yet another example, the first device may be preregistered or associated with the user's account. The event detected at a first device may include, but is not limited to, one or more of: receipt of voice call request at the first device, receipt of a messaging service message at the first device or a change in battery level relative to a predetermined level at the first device.

One or more characteristics of the event based on the first indication of the event may be determined. The characteristics of the event may include, but are not limited to, a time at which the event is received, a category of the event, a priority of the event, or a user account associated with initiation of the event. In some implementations, the one or more characteristics of the event determined can include a location of a client computing device at which a notification is received and a model or device type (e.g., tablet, cell phone, smartphone, etc.). The characteristics of the event may also include a category or type of the event (e.g., short message, phone call, video call, etc.). It may be detected whether the determined characteristics match at least one selection criterion. For example, the selection criterion may be matched when the determined characteristics include a receipt of a messaging service message at the first device from a user contact associated with the user account. In another example, the selection criterion may be matched when the determined characteristics include a missed call at the first device from a user contact associated with the user account. In yet another example, the selection criterion may be matched when the determined characteristics include a low battery warning at the first device. In some implementations, the first indication of the event may not be broadcasted for display to the second device associated with the user account if the determined characteristics do not match the at least one selection criterion. In this way, the disclosed implementations can be selective in providing notifications of events.

A second device (and any additional devices) from one or more devices associated with the user account can be automatically identified. For example, the second device may be a device that the user may have signed in or logged into with user credentials that may include the username and the password used to log into the first device. The first indication of the event, based on the determined characteristics, is provided to the second device associated with the user account. The provided first indication of the event can be displayed in real time or near real time at the second device (and the additional devices) to allow management of the event at the first device from the second device. As a non-limiting example, the indication of the event can be displayed as a notification in a browser or any other web content viewing system at the second device. If the user is in physical proximity to the second device, the user may interact with the notification to timely manage the event (e.g., answer call, dismiss call, reply to text, turn device off, etc.) at the first device.

In this way, the user may be able to view an indication of the event at the second device that may be near the user as soon as the event occurs at the first device that is away from the user. Furthermore, the user can interact with the displayed notification at the second device to manage the event occurring at the first device. This improves user experience. It is to be appreciated that the disclosed implementations are not limited to scenarios when the user is physically distant from the user's device. The disclosed implementations are also useful when a user's primary attention is being given to a computer or any device that is different from a device where an event occurs. For example, a user's phone can be in the user's pocket when an event occurs at the phone or the phone may have the phone's ringer disabled. In this scenario, when the user is seated in front of their computer screen (e.g., laptop or desktop screen), the user can see a notification of an event occurring at the phone on the computer screen. This allows the user to more quickly decide how to address an interruption resulting from an event at the user's phone, rather than change their focus to the phone (e.g., by pulling the phone out of a pocket or purse, etc.). This example is illustrative and is not intended to limit the disclosed implementations.

Some aspects of the subject technology include storing information regarding a user account at a server. The user has the option of preventing storage of such information. The user may also be provided with an opportunity to control whether programs or features collect or share user information (e.g., information about a user's account information, a user's preferences, etc.). Thus, the user may have control over how information is collected about the user and used by a server.

FIG. 1 is a diagram illustrating example architecture for cross-device notifications according to some implementations of the subject technology. Server 180 includes processor 112, memory 120, storage 126, bus 124, input/output module 128, input device 116, output device 114 and communications module 118. Memory 120 includes event determiner 132 and client device identifier 134. Server 180 may additionally include an output device (e.g., touch screen display, non-touch screen display), input device (e.g., a keyboard, touchscreen, or mouse) to receive user input. In some implementations, server 180 includes one or more modules for facilitating user interaction with via a browser or a special purpose application executing on client computing device 190 or for processing data stored at other components including and interacting with the components of FIG. 1. Server 180 may be implemented as a single machine with a single processor, a multi-processor machine, or a server farm including multiple machines with multiple processors. Communication module 118 can allow server 180 to send and receive data over network 150 to cloud messaging server 110, cache server 196 and client computing devices 190 and 192. While FIG. 1 illustrates two client computing devices, it is to be appreciated that the system is not limited to these client computing devices and can operate and communicate, for example, with any number of computing devices in parallel and in real time.

In some implementations, server 180 can be associated with a cloud messaging server 110 and may send and receive data over network 150 to cloud messaging service 110. Cloud messaging service 110 may then forward data received from server 180 to client computing devices 190 and 192. Client computing devices 190 and 192 may send and receive data to and from server 180 via cloud messaging service 110 or may send and receive data directly to and from server 180. This example is illustrative and is not intended to limit the disclosed implementations. In some implementations, the functionality provided by cloud messaging server 110 can be included in server 180 and a separate cloud messaging server 110 need not be provided. An operation of cloud messaging server 110, in accordance with some implementations, is discussed further below.

In some implementations, cache server 196 can store or cache data including but not limited to video, audio, text, images or any combination thereof. The data stored at the cache server 196 may be provided for display in web pages, notifications or any other web content areas. In some implementations, some data stored at cache server 196 may have a predefined time to live or expiration time after which the data may be deleted or cleared from cache server 196.

In some implementations server 180 can be associated with a social data server 194 that includes social data and may send and receive data over network 150 to the social data server 194. In some implementations, social data server 194 may store social content item(s) (e.g., posted content item(s)) associated with a social networking service). Social data server 194 may also store data related to user accounts and content items that are associated with the user accounts. For example, social data server 194 can include data indicating content items that have been viewed, shared, commented on, favored or disfavored by a user account associated with a user. Social data server 194 may store a social connection data structure that is indicative of social connections between user accounts associated with the social networking service. Social data server 194 may also store user comments made (or annotations) towards multimedia content consumed by the user and stored at multimedia server 196.

In some implementations, cloud messaging server 110, cache server 196, social data server 194 and server 180 can communicate with one another and with client computing devices 190 and 192 via a network 150. Network 150 may include the Internet, an intranet, a local area network, a wide area network, a wired network, a wireless network, or a virtual private network (VPN). While only one cloud messaging server 110, cache server 196, social data server 194 and server 180 are illustrated, the subject technology may be implemented in conjunction with any number of cloud messaging servers 110, cache servers 196, social data servers 194 and servers 180, and client computing devices. In some non-limiting implementations, a single computing device may implement the functions of cloud messaging server 110, cache server 196, social data server 194 and server 180.

Client computing device 190 or 192 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 or 192 may each include one or more of a keyboard, a mouse, a display, or a touch screen. Client computing device 190 or 192 can instantiate a browser configured to display webpages as well as notifications and indications of events occurring at computing devices. It is to be appreciated that notifications and other content provided in accordance with the implementations may also be displayed outside the browser.

In some implementations, client computing devices 190 and 192 may include software implemented in hardware memory and executable using one or more processors. The software can allow client devices to communicate with the server 180. For example, the software may allow receipt of data (e.g., messages and notifications) from server 180 and transmission of data to server 180 and other components illustrated in FIG. 1. The software may be preinstalled at client devices 190 and 192 or may be installed by a user. The software may be automatically installed at client computing devices 190 and 192 when the client computing devices 190 and 192 perform software updates. The software may automatically configure and re-configure at any time client computing devices 190 and 192 as a transmitter (or source) or a receiver (or sink). The software may configure client computing devices 190 and 192 automatically detect events (e.g., incoming phone call, message received, low battery, etc.) and provide an indication of the detected events to server 180. The software may be available for download via a mobile application marketplace or store. In some implementations, a user account identifier (e.g., an email address) or any other identifier may be received from the user via the software that allows computing devices 190 or 192 to register with the server 180.

In some implementations, when a valid user account identifier and password is received (or a user is authenticated) at computing devices 190 or 192, the devices may be associated with the user account. For example, if a user owns or has access to both client computing devices 190 and 192, the user may provide the identifier and a password at the software installed at any one of the computing devices 190 and 192 to associate both devices with the user account. An indication to register with server 180 may also be received via the software. In this way, computing devices 180 may be registered for communication with server 180.

In some implementations, a registration process of client computing devices with server 180 may have asynchronous failure points. In other words, the client computing devices may automatically retry (or avoid retries) to connect and register with server 180 based on connectivity states of the client computing devices 190, 192 or server 180. In this way, the client computing devices 190, 192 and server 180 may attempt to remain in a connected state. In some implementations, a user interface may be provided at the client computing devices 190 and 192 to allow users to check the connectivity state and other parameters associated with the service (or service health). It is to be appreciated that in some implementations computing devices 190 and 192 may be preregistered or preconfigured for communication with the server 180 and additional registration or configuration of computing devices 190 and 192 may not be needed.

As discussed above, memory 120 of server 180 can include event determiner 132 and client device identifier 134.

In some implementations, event determiner 132 receives a first indication of an event detected at a first device (hereinafter client device 190) associated with a user account and determines one or more characteristics of the event based on the first indication of the event. In some implementations, the event determiner 132 may generate notifications for certain types of events. For example, when the first indication of the event is received at the event determiner 132, event determiner 132 may check if the event is a particular type of event (e.g., phone call, missed call, text message from a contact). The particular type of event may be a priority or time sensitive event. If it is determined that the event is the particular type of event, then event determiner 132 may instruct the client device identifier 134 to identify and forward a notification of the event for display at a second device (hereinafter client device 192). Otherwise, in some implementations, if it is determined that the event is not the particular type of event, then event determiner 132 may not instruct the client device identifier 134 to identify and forward a notification of the event for display at a second device (hereinafter client device 192). In this way, event determiner 132 may select certain events for notification at client computing devices based on characteristics of the event. Thus, an intended viewer of the notifications may only be interrupted by notifications that may be useful to the viewer. In some implementations, the disclosed implementations can selectively forward notifications that are unique, uniquely sourced or distinct at a first computing device (e.g., client computing device 190). In this way, the user need not receive and be potentially overwhelmed by duplicate notifications relayed to a second computing device (e.g., client computing device 192). In some implementations, categories of events that include the particular type of event may be stored in database 192.

As discussed above, in some implementations, the characteristics of the event may include, but are not limited to, a time at which the event is received, a category of the event, a priority of the event, or a user account associated with initiation of the event. In some implementations, the one or more characteristics of the event determined can include a location of a client computing device at which a notification is received and a model or device type (e.g., tablet, cell phone, smartphone, etc.). The characteristics of the event may also include a category or type of the event (e.g., short message, phone call, video call, etc.). In some implementations, event determiner 132 may detect whether the determined characteristics match at least one selection criterion. For example, the selection criterion may be matched when the determined characteristics include a receipt of a messaging service message at the first device from a user contact associated with the user account. In another example, the selection criterion may be matched when the determined characteristics include a missed call at the first device from a user contact associated with the user account. In yet another example, the selection criterion may be matched when the determined characteristics include a low battery warning at the first device.

Client device identifier 134 automatically identifies a second device from one or more devices associated with the user account and provides the first indication of the event, based on the determined characteristics, to client device 192 associated with the user account. For example, client device identifier 134 may review database 192 connected to network 150 to determine which devices have been associated with the user account. Such association of devices with the user account may be performed by server 180 when, for example, user account information is received by the server during registration with the server 180. At client device 192, the provided first indication of the event can be displayed at to allow management of the event at the client device 190 from the client device 192. In some implementations, the first indication of the event may not be broadcasted for display by client device identifier 134 to the second device associated with the user account if the determined characteristics do not match the at least one selection criterion. In this way, the disclosed implementations can be selective in providing notifications of events.

Figure 2:
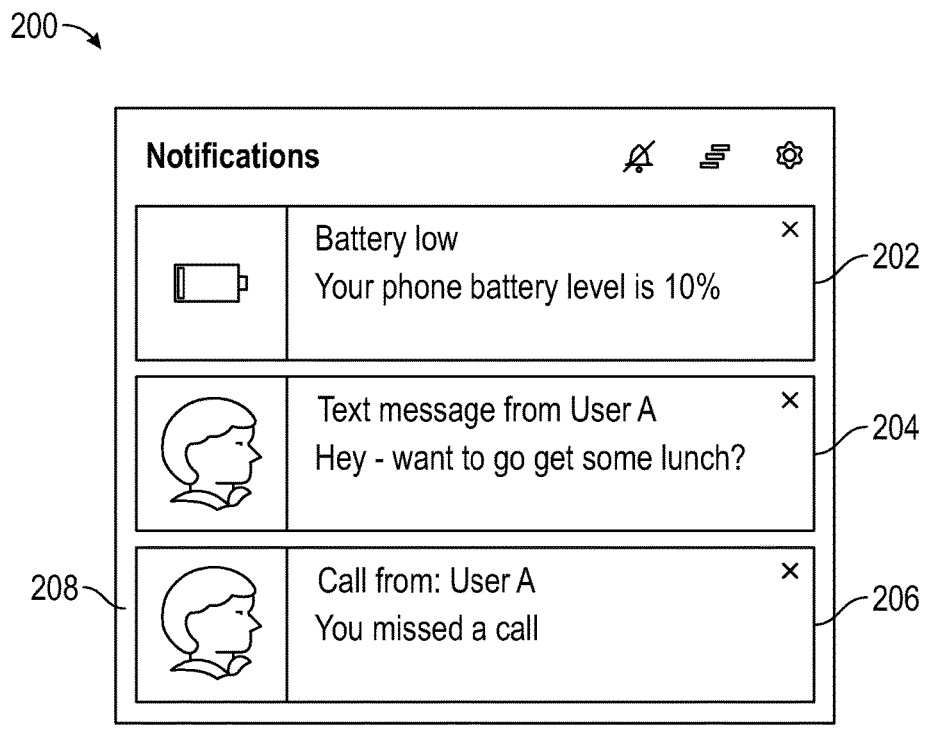
FIG. 2 illustrates an example user interface at a client computing device including displayed indications of events.

FIG. 2 illustrates an example user interface 200 at client computing device 192 (e.g., desktop or laptop) that includes displayed indications of events (e.g., notifications) that may be detected at computing device 190 which, in this example, can be a smartphone. Displayed indication of event or notification 202 indicates that the battery level of computing device 190 is "low" and is at "10%" of full battery level. Notification 204 indicates that a text message has been received from User A. The contents of the text message are also displayed (e.g., "Hey—want to go get some lunch?"). Notification 206 indicates that a phone call from User A was missed. As discussed above, in some implementations, notifications 202-206 may be simultaneously displayed in real time or in near real time at client computing device 192, and any other client computing devices associated with the user account, as respective events occur at client computing device 190. Thus, it is to be appreciated that the notifications may be also displayed simultaneously at devices other than client computing device 192 that are associated with the user account. This allows a user to conveniently view a notification on any of the client computing devices that may be associated with the user's account and the user need not be tied to being near a particular device to view or interact with a notification.

In this way, the disclosed implementations can provide a unified notification, messaging and content stream. Furthermore, the notifications may also include audio, video or any combination thereof. Interactions with the notifications may be performed via voice, touch, stylus or any other mechanism.

Returning to FIG. 2, an indication of an event that is received later may be displayed above an indication of an event that is received earlier. For example, notification 204 may indicate an event that has occurred after the event associated with notification 206. This example is illustrative and is not intended to limit the disclosed implementations. Notifications 202-206 may also be associated with images or other content to provide a visual indication of a user account associated with the notification, a category of the notification or any other characteristic of the notification. For example, image 208 associated with notification 206 is an image associated with a user account of User A.

In some implementations, in order to display images (e.g., image 208) when the event is initiated from another user account different from the user account associated with client computing devices 190 and 192, the client computing device at which the event occurs (e.g., client computing device 190) can determine whether an image associated with the other user account is available at the client computing device 190. When the image is available at the client computing device 190, the client computing device 190 generates a reference to the image. The reference may be a hash value or message digest. As a non-limiting and illustrative example the hash value may be generated using a cryptographic hash or secure hash algorithm (SHA) (e.g., SHA-256). Based on the generated reference, the client computing device 190 may determine whether the image is also available at remote cache server 196. When it is determined that the image is not available at cache server 196, the client computing device 190 may upload the image to cache server 196.

When the image is determined to be available at cache server 196, the client computing device 190 can include the generated reference in the first indication of the event provided to server 180. Client computing device 192 can retrieve the image from cache server 196 based on the reference when the reference is received in the notification from server 180 and if the referenced image is not already available at client computing device 192. In some implementations, client computing device 190 may use an application programming interface (API) to upload the image to the cache server 196. The image may be in any image format or encoding (e.g., JPG, PNG, etc.). In some implementations, when the image is uploaded to cache server 196, the cache server 196 generates and returns the reference value to the client computing device 190. The reference may then be used by any client computing device, including client computing device 192, to retrieve the image for display.

In some implementations, client computing devices 190 and 192 may use a "check image" function to determine whether the image is available at cache server 196. In some implementations, the client computing devices 190 and 192 may use an image retrieval function to provide a hash value of the image and in return receive the image from cache server 196. In this way, the image need not be transmitted to server 180 (and to client computing device 192) from client computing device 190 each time an event occurs at client computing device 190. Instead, a reference that addresses the image at cache server 196 may be provided by client computing devices 190, 192 and server 180. The image may be retrieved from cache server 196 based on the reference. Thus, use of additional network bandwidth, that may have been needed to transmit images, can be saved.

In some implementations, in order to control access to images (and other content) in cache server 196, client computing devices 190 and 192 may encrypt each image with a uniquely generated key for the image. In some implementations, the generated key can be transmitted by client computing devices 190 and 192 (or server 180) over a secure messaging system to one or more other devices that may display an indication (e.g., message or notification) including an image to respective users. In some implementations, since server 180 may not retain encryption keys after image delivery, images in cache server 196 can remain encrypted at rest, and may not be read by unauthorized users or system operators who may not possess valid encryption keys. In some implementations, a unique image encryption key can be generated from a hash of an image itself. This allows for a given image (e.g. a profile picture of a user), to only be stored once in cache server 196 and shared among all the other notifications that reference the given image. However, client computing devices 190 and 192 that may have the image encryption key can decode the image for display to a user.

In cryptography, a keyed-hash message authentication code (HMAC) can be a construct for calculating a message authentication code (MAC) involving a cryptographic hash function in combination with a secret cryptographic key. A salt value may be random data that is used as an additional input to a function that hashes a password or passphrase.

$$\text{Image\_index} = \text{HMAC}(\text{index\_salt}, \text{image}) \quad (1)$$

$$\text{Image\_key} = \text{HMAC}(\text{key\_salt}, \text{image}) \quad (2)$$

$$\text{Cached\_image} = \text{Encode}(\text{image\_key}, \text{image}) \quad (3)$$

Referring to example function (1) above, an Image_index may be computed as HMAC(index_salt, image) where "image" is image data and index_salt is a salt value. Referring to function (2), Image_key may be computed as HMAC (key_salt, image) where "image" is image data and key_salt is a salt value. Image_index and image_key can be transmitted in each indication (e.g., notification message) from server 180 to authorized client devices (e.g., client computing devices 190 and 192), enabling them to retrieve and decode the corresponding cached image. Cached_image can be stored and retrieved from cache server 196 using image_index as an access key.

In some implementations, each cached image may be encrypted with a unique key generated on a first device (e.g., client computing device 190) prior to transmission to a second device (e.g., client computing device 192) with a first indication of the event. In some implementations each cached image can be associated with a content-based key generated on client computing device 190 and transmitted to client computing device 192. A benefit of the content-based key (e.g. a hash of the image) is that each (encoded) image may only need to be stored once at cache server 196, since a unique key may not be needed to decode the image. In some implementations, a time-to-live (TTL) value with an indication of the event may be included, where the TTL value indicates an expiration time of the first indication (or any other indication or notification message). In some implementations, a TTL value may be implemented as a counter or timestamp attached to or embedded in the indication of the event. Once the prescribed event count or timespan has elapsed, the indication of the event may be discarded. In this way, by using a TTL value, the disclosed implementations can be optimized by removing queued indications of events that may not be delivered before their expiration time.

Figure 3A:
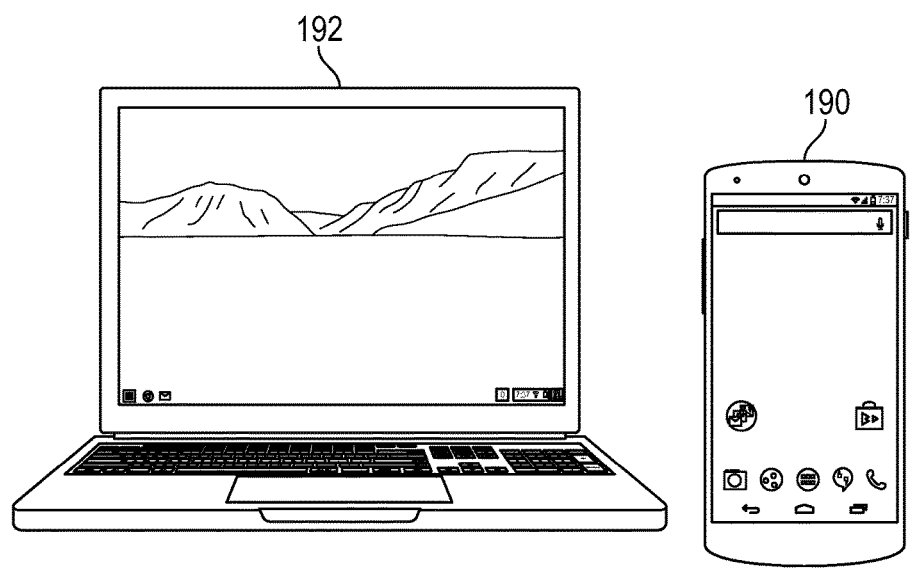
FIGS. 3A-3F illustrate example scenarios where notifications are displayed at a computing device based on an event occurring at another computing device.
Figure 3B:
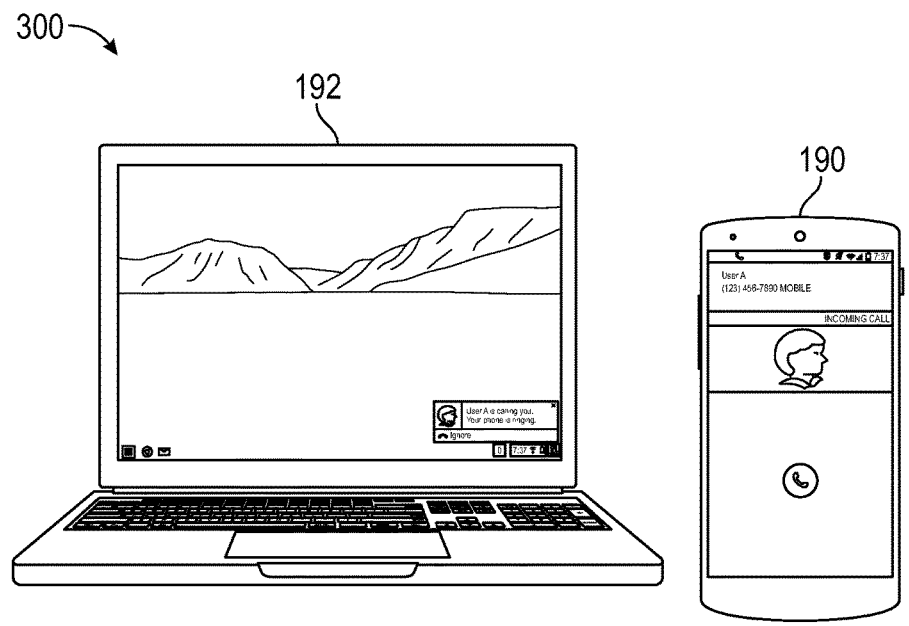

FIG. 3A illustrates an example where client computing device 190 is a smartphone and client computing device 192 is a laptop computer. In FIG. 3A, notifications associated with client computing device 190 are not yet being displayed. FIG. 3B illustrates a scenario where a call from User B is received at client computing device 190. As the call is received, notification 310 is displayed at client computing device 192. The notification can include an image of the caller or User B. In an example, where a notification is an incoming call notification for an incoming call event at client computing device 190, the notification may be displayed at client computing device 192 in real time as the call is incoming and regardless of whether client computing device 190 is ringing, vibrating or in a silent mode. The notification may also display a caller identifier (or a name) associated with a number originating the call and a description of the notification (e.g., "Your phone is ringing").

Figure 3C:
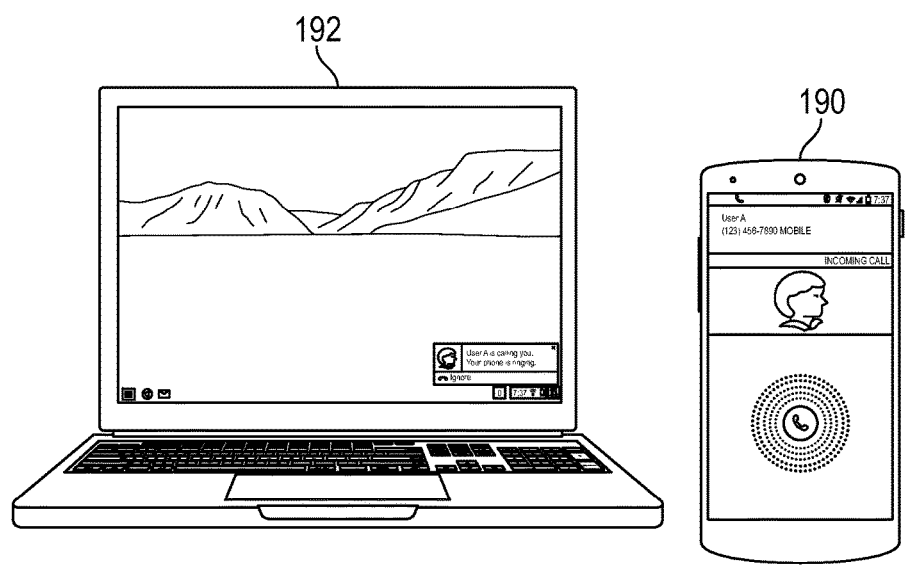
Figure 3D:
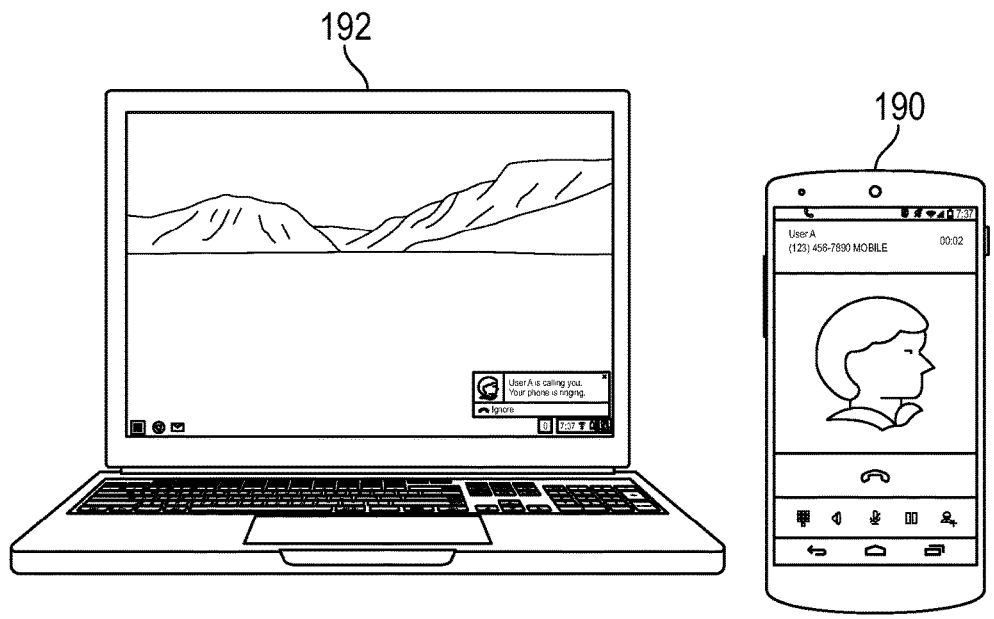

FIGS. 3C and 3D illustrate scenarios where client computing device 190 continues to be in a call incoming state and the user at the client computing device 192 may choose to answer the call at any time when the call is being received or incoming. In addition, both call ignore and answer buttons can be displayed that allow the user at the computing device 192 to dismiss or answer the call.

In this way, a user using a desktop or a laptop computer may view and interact with the notification of the incoming call in real time. The notification may be displayed in a browser executing on client computing device 192. When the user answers the call at client computing device 192, client computing device 190 may stop ringing or vibrating and the user may have a conversation with the caller (using a microphone and speaker associated with client computing device 192). The disclosed implementations are not limited by geographic distances. For example, a user's phone that is located in Beijing may receive an incoming call while the user is physically present at the user's desk in New York. The user may then answer the call made to the phone in Beijing, in real time, while the user is in New York. This example is illustrative and is not indented to limit the disclosed implementations.

Figure 3E:
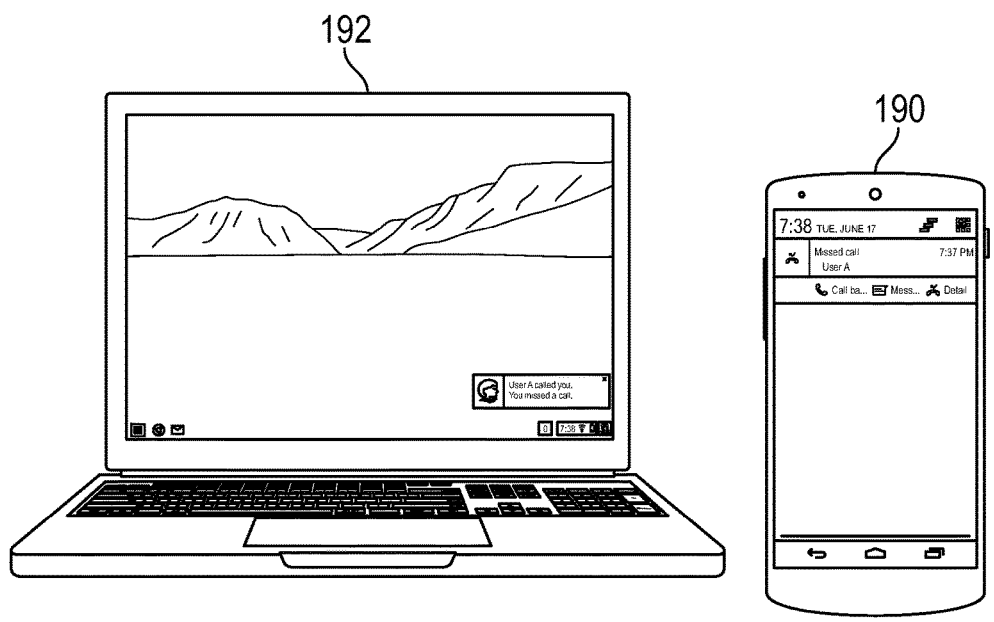

In some implementations, when the user answers a call the user's status indicator that may be displayed via a messaging service may change to indicate that the user is in a voice call with, for example, User B. The user may select a "hang-up" or end call user element that may be displayed on the notification to terminate the call. If the user chooses not to answer the call, then, as shown in FIG. 3E, the "Your phone is ringing" notification can automatically change to "You missed a call notification" after the incoming call terminates and remains unanswered. Any changes in notifications or dismissals of notifications can be instantaneously propagated to all devices associated with the user's account. In this way, all client computing devices associated with the user's account can remain synchronized.

In some implementations, the voice data associated with the call may be relayed from client computing device 190 to client computing device 192 via server 180. In other implementations, the voice data may bypass the client computing device 190 and may be relayed directly from the call originating device via server 180 to client computing device 192. Any other form of data relay or transmission may be used. The caller need not know or be concerned with whether the user is using client computing device 190 or 192. In this way, from both the caller and callee's perspectives, the disclosed embodiments provide a seamless and real time experience. If the user does not answer the call or dismiss the call, a missed call notification (e.g., notification 206) may be displayed at client computing device 192. Furthermore, it is to be appreciated that notifications 202-206 may be displayed simultaneously and in real time (or near real time) at other devices, together with client computing device 190 and 192, that may be associated with the user account also associated with client computing devices 190 and 192.

Figure 3F:
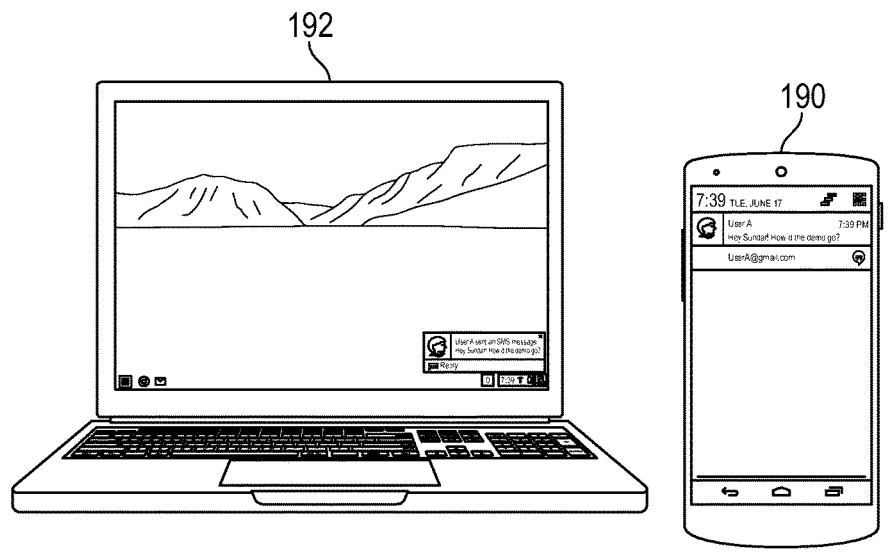
Figure 4A:
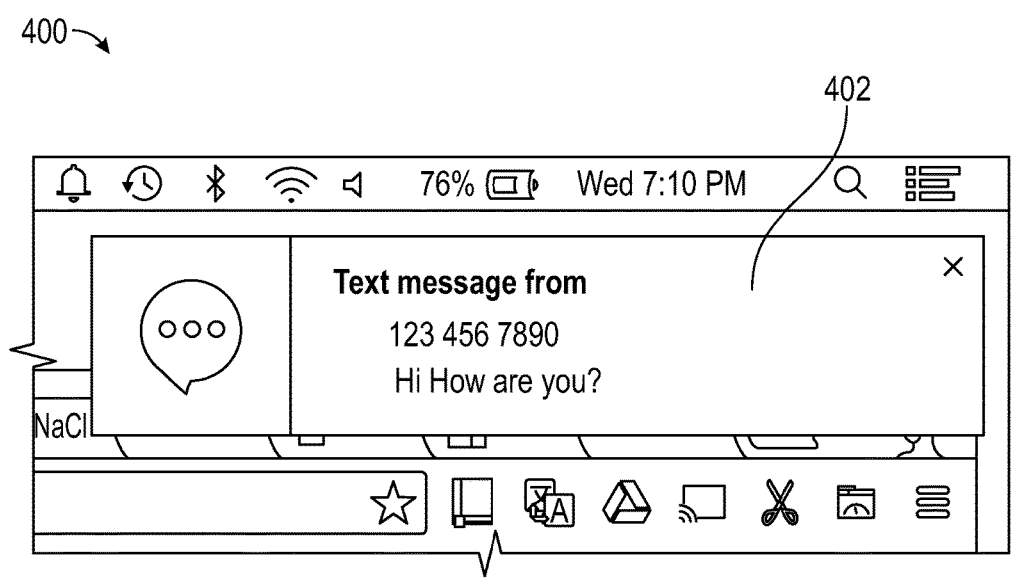
FIG. 4A illustrates an example of a displayed notification.

In an example, where a notification is a messaging service message (e.g., short messaging service message or SMS) received at client computing device 190, the notification may be displayed at client computing device 192 instantaneously upon receipt of the message. The client computing device 190 may be in a ringing enabled, vibration or silent mode. The notification may also display a caller identifier (or a name) associated with a number or account originating the message (e.g., image 208). In this way, a user using a desktop or a laptop computer may view the notification (e.g., notification 204) of the message in real time or near real time. The notification may be displayed in a browser executing client computing device 192. Also, as shown in FIG. 4A, notification 402 may be displayed outside the browser and on a desktop area of client computing device 192. FIG. 3F illustrates another scenario where a notification is displayed on a desktop area of client computing device 192. The desktop area may be an area independent of other displayed applications executing at client computing device 192.

Figure 4B:
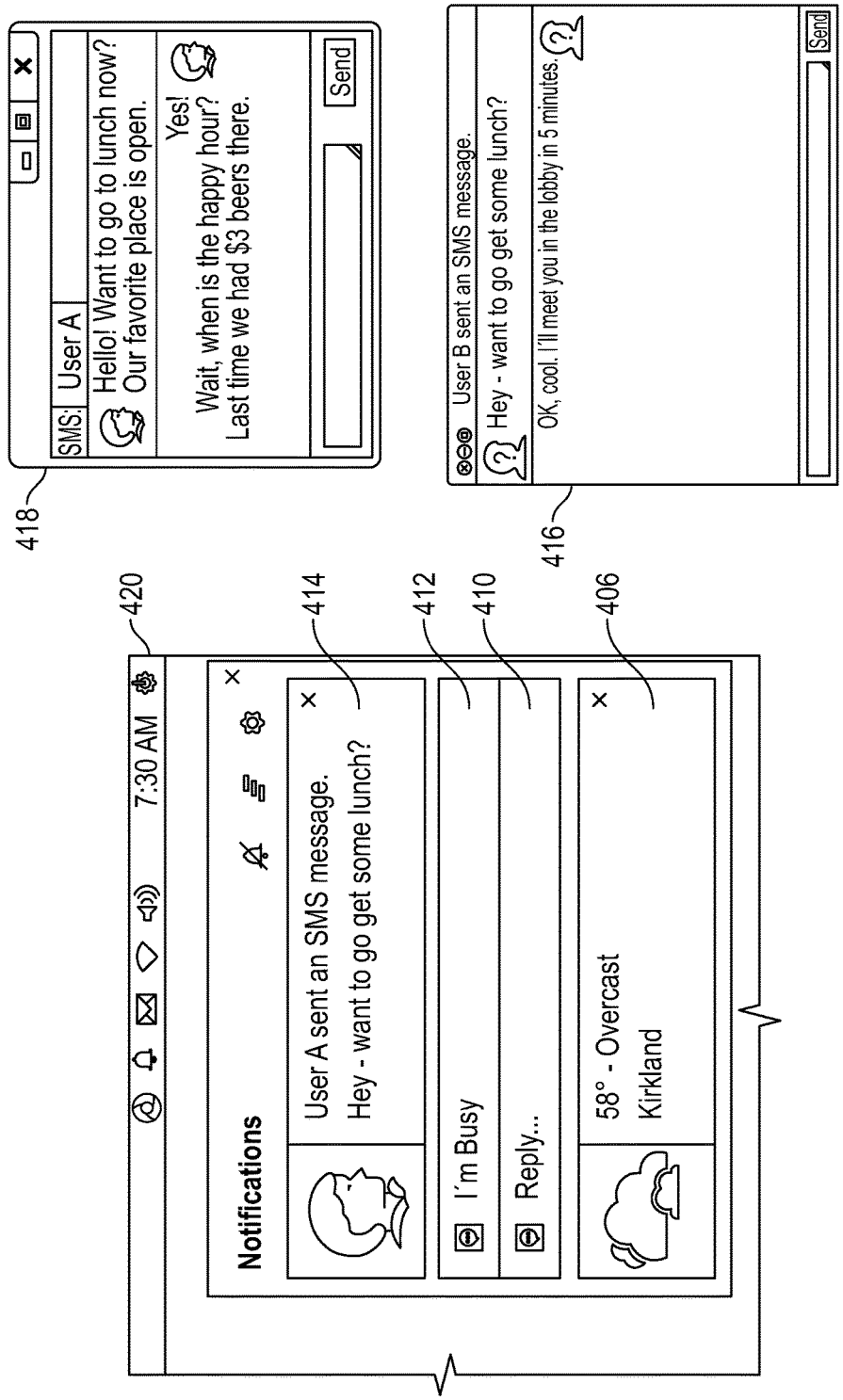
FIGS. 4B and 4C illustrate different example notification interfaces.

FIG. 4B illustrates notification interface 420 that includes notifications 414 and 406. Notification 406 is a notification that indicates current weather conditions. The weather conditions may be associated with a geographic location of client device 190 or client device 192. The geographic locations may be different (e.g., different rooms in a house, different cities, countries or continents, etc.). The user may interact with the notification at the client computing device 192 respond to User A's messaging service message (e.g., "Hey—want to go get some lunch?") via reply element 410 or "I'm busy" element 412. As a non-limiting example, selecting element 412 may provide a preconfigured response to the sender of the message that the user is currently busy or unable to respond. The user may dismiss any notification by selecting close or dismiss element 414 associated with respective notifications. In some implementations, when a user dismisses a notification, other instances of the notification that may be displayed at other computing devices associated with the user's account are also dismissed at the same time. When a user selects the reply element 412, interface 416 may be instantiated at client computing device 192. In some implementations, user interface 416 may display one or more previous messages received from the sender of the message in addition to the most recent message. This provides the user of client computing device 192 with context which may be used by the user to appropriately respond to the most recent message.

Figure 4C:
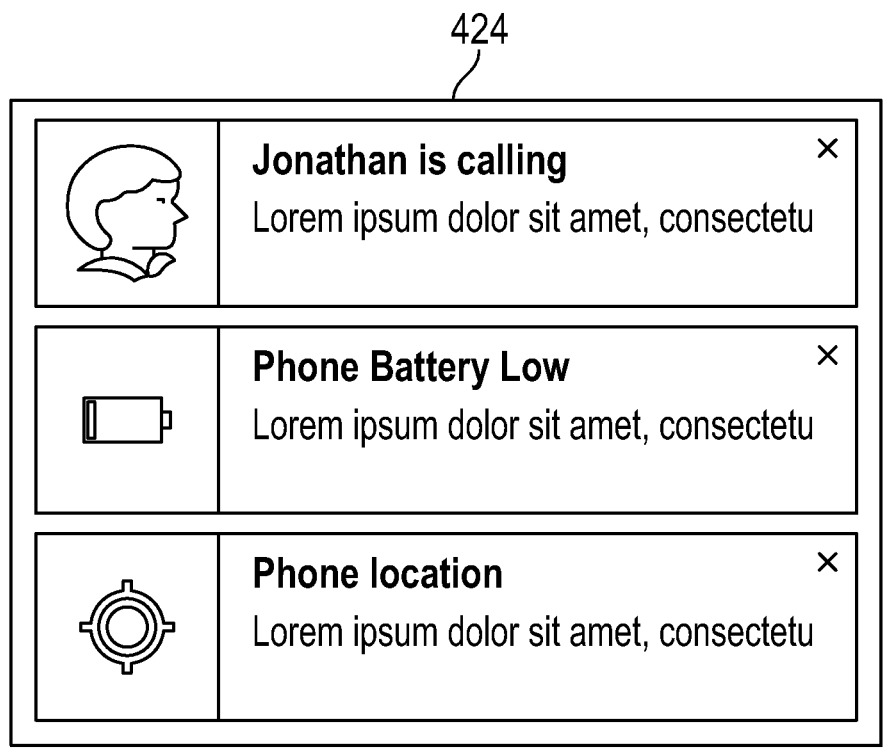

In some implementations, the user of the client computing device 192 may use interface 416 to send and view any number of messages and may close or terminate interface 416 at any time. Interface 418 is another interface similar to interface 416 that allows a user at the client computing device 192 to send and receive messages. FIG. 4C illustrates other notification interface 424. Referring to FIG. 4C, the notifications may also include a notification indicating a location of client computing device 190 (e.g., a smartphone).

It is to be appreciated that the disclosed implementations are not limited to short messaging service messages and can use any other form of messaging system, method or framework. In some implementations, notifications received from client computing device 190 at client computing device 192 may be associated with an expiration time or a time to live (TTL) value. For example, if the time to live value is one hour, the message may be hidden from display or deleted an hour after it is received and displayed at the client computing device 192. This example is illustrative and is not intended to limit the disclosed implementations.

In some implementations, interface 416 (or 418) may be automatically instantiated for display at client computing device 192 when a message is received at client computing device 190. In other implementations, interface 416 (or 418) may be automatically instantiated for display at client computing device 192 upon a user interaction (or indication to send a message) at client computing device 192. In some implementations, client computing device 192 may automatically manage a number of messaging interfaces so that those that are inactive for a predetermined period of time may be automatically minimized by client computing device 192. In this way, the user need not experience crowding of multiple messaging interfaces. In some implementations, visual styling of interface 416 or 418 including any icons may be automatically determined based on a visual interface or styling theme of computing device 192 or may be determined by server 180 or even set by a user of computing device 192.

In some implementations, an indication may be displayed to the user via interface 416 that messages provided via interface 416 may incur third-party messaging fees in some situations. In some implementations, interface 416 may be associated with a cloud based communication service accessible via client software of the service executing at client computing device 192. The cloud based communication service may allow video, audio and text communication between two or more users including video, voice and text conferencing between multiple users. In some implementations, communications sent or received via an interface of the cloud messaging service at client computing device may have a different displayed visual style from interface 416 or 418.

In an example, where a notification is associated with a battery level at the client computing device 190, the notification may be displayed at client computing device 192 in real time or near real time. For example, when the battery level at the client computing device 190 (or any other device associated with the same user account as client computing device 192) falls below a predetermined threshold value (e.g., 10% of full battery level), client computing device 190 may detect this event and transmit an indication of this event to server 180. Server 180 may then forward the indication for display at client computing device 192. A user at the client computing device 192 may then interact with the notification and provide an action to manage the event. For example, the user may indicate that client computing device 190 is to be turned off or powered down by providing an input via the displayed notification. Upon receipt of the action at the client computing device 190 via server 180, the client computing device may be automatically powered down or turned off. In some implementations, the user may also indicate that one or more notifications displayed at the client computing device 190 should be cleared or dismissed.

Figure 5:
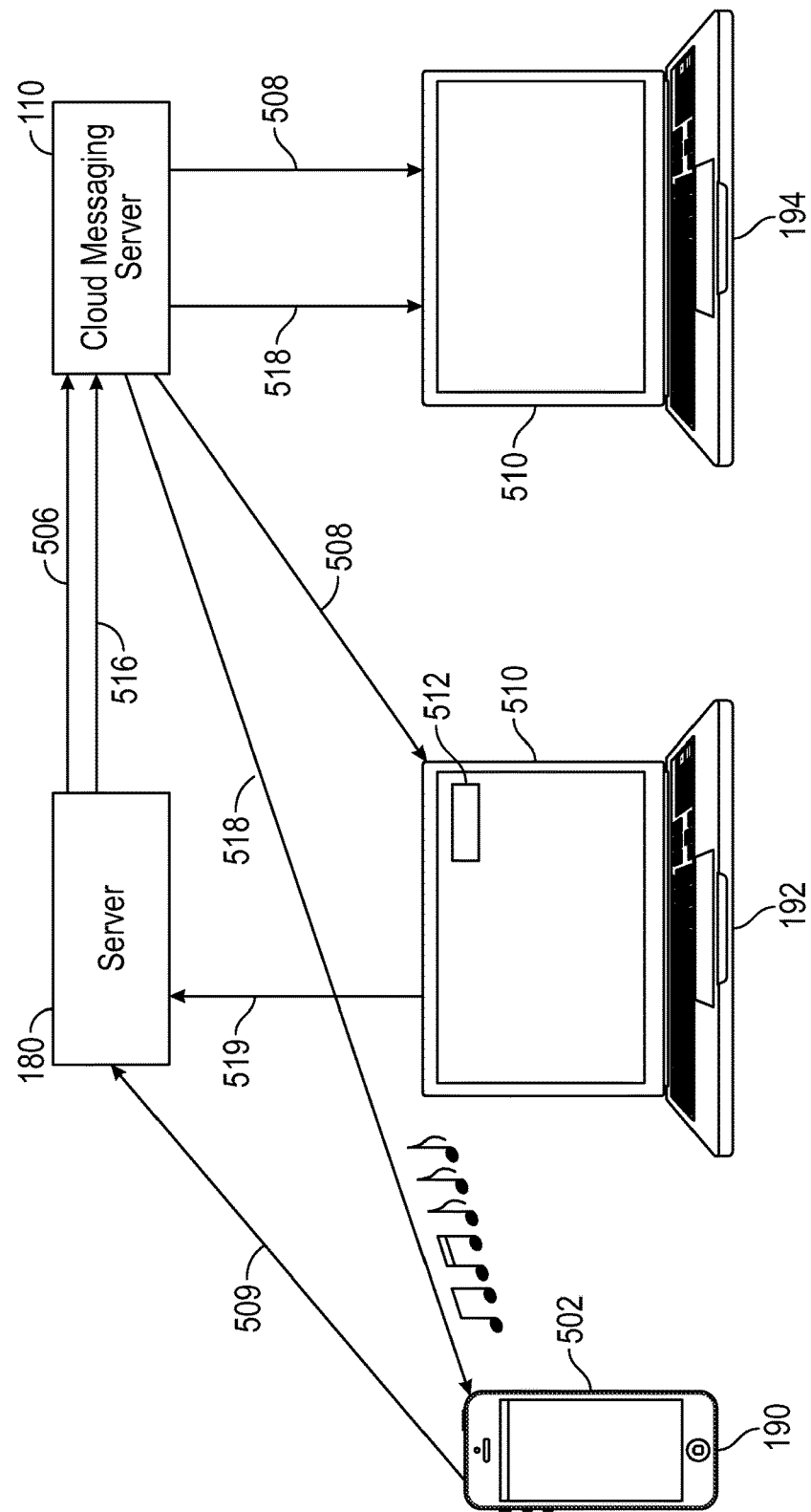
FIG. 5 illustrates an example messaging flow between some components illustrated in FIG. 1.

FIG. 5 illustrates an example messaging flow between client computing devices 190-194, server 180 and cloud messaging server 110. Client computing devices 190-194 may be associated with the same user account. Client computing device 190 may be a smartphone, tablet or any mobile device and client computing devices 192 and 194 may be desktop computers or laptops.

In stage 502, an event may occur and may be detected by client computing device 190. In stage 504, the client computing device 190 may send the indication of the event (or notification) to server 180. Server 180 may then determine other computing devices associated with the same user account. Particularly, server 180 may determine that client computing devices 192 and 194 are associated with the same user account in addition to client computing device 190. Client computing devices 192 and 194 may also be determined to be receivers or "sinks" for event notifications and separate from the source or transmitter client computing device 190.

In stage 506, server 180 may then broadcast or simultaneously provide the notification to software clients (e.g., browsers) at client computing devices 192 and 194. In stage 508, notifications broadcast from server 180 may be relayed to the software clients at the client computing devices 192 and 194 by cloud messaging server 110. In stage 510, the notifications may be displayed at the client computing devices 192 and 194 simultaneously and in real time. In stage 512, an interaction including an action may be received via the displayed notification at the client computing device 192. In stage 514, the indication including the action may be provided to the server 180. In stage 516, server 180 may broadcast the action to all client computing devices 190, 192 and 194 via cloud messaging server 110. In stage 518, cloud messaging server 110 may provide or forward the action to initially determined source client computing device 190 as well as the receiver client computing devices 192 and 194.

In some implementations, one or more service messages may be exchanged between one or more components illustrated in FIG. 1. In some implementations, a register message may be provided by client computing device 190 or 192 to server 180. The register message may be provided when a user provides, via an authorization interface at client computing device 190 or 192, a username or email address with a password and confirms an intent to register with notification and messaging services provided by server 180. In some implementations, a un-register message may be provided by client computing device 190 or 192 when a user at client computing devices 190 or 192 indicates via a user interface that the user would like to discontinue services from server 180.

In some implementations, a client computing device 190 or 192 can request a ping message to be sent from server 180 back to the requesting client computing device 190 or 192 to test a connection to server 180. In some implementations, responsive to a request from client computing device 190 or 192, server 180 can send a list of client computing devices that are associated with a particular user account. The list may also indicate whether a client identified in the list is a source or a sink. As described above, a notification may be generated at a client that can be then broadcast by server 180 to other client computing devices that are receivers or sinks associated with a particular user account. An action message may be transmitter to server 180 from client computing devices 190 or 192 when a user interacts with a notification and indicates that an action that is to be taken to manage an event from any one of the computing devices.

In some implementations, the action message may include an identifier of the action. In some implementations, when the action message is transmitted by server 180 to a client computing device where the event has occurred and is to be managed, the client computing device may automatically determine the action to be taken based on the action identifier and process the action. For example, a call may be dismissed at the client computing device. In some implementation, server 180 and other components may process messages independent of message properties. In other words, and for example, server 180 may treat message properties as opaque. In this way, additional features (e.g., notification and actions) may be conveniently deployed by updating client software that may be installed at client computing devices 190 and 192 and changes at server 180 may not be needed. In some implementations, service messages discussed above and any other messages and notifications (or indications of events) may be transmitted over Transmission Control Protocol or TCP. TCP is a protocol associated with the Internet Protocol (IP) suite. TCP may generally, and for example, operate between end systems including, but not limited to, a web browser and a web server. TCP may allow delivery of a stream of bytes from a software program from one computer to another computer. TCP is provided as an example and is not intended to be limit the disclosed implementations. Any other protocols including Hypertext Transfer Protocol (also known as HTTP) or secure HTTP may be used.

In some implementations, service messages discussed above and any other messages and notifications may be transmitted between the components illustrated in FIG. 1 using, for example, a JavaScript Object Notation (JSON) format. Use of a format such as JSON allows efficient encoding and parsing of messages at the components as well as convenient debugging as a result of JSON's human readable format. Furthermore, when third party services may interact with the components illustrated in FIG. 1, they may also use JSON to provide appropriately formatted notification, service messages and content and may also be able to parse actions and responses received in the JSON format. It is to be appreciated that the use of the JSON format is purely illustrative and is not intended to limit the disclosed implementations. Other formats may be also be used by the components of FIG. 1 and by any other services and systems associated with the components.

The disclosed subject matter relates to cross-device notifications. Some implementations include receiving a first indication of an event detected at a first device associated with a user account, determining one or more characteristics of the event based on the first indication of the event, detecting whether the determined characteristics match at least one selection criterion, automatically identifying a second device from one or more devices associated with the user account and providing, if the determined characteristics match the at least one selection criterion, the first indication of the event to the second device associated with the user account, where the provided first indication of the event is displayed at the second device to allow management of the event at the first device from the second device. Some implementations include receiving a second indication including an action that is to be performed with respect to the event received at the first device, the second indication generated upon an interaction with the displayed first indication of the event at the second device and transmitting the action to the first device, where the event can be managed at the first device based on the action.

Some implementations include receiving first content associated with the first indication of an event and providing the received first content to the second device associated with the user account for display with the first indication of the event. Some implementations include when the content includes a reference to an image in a remote cache, providing the reference to the second device, where the second device retrieves the image for display from the cache based on the reference when the image may not available at the second device. Some implementations include receiving second content responsive to the displayed first indication of the event at the second device and providing the received second content to the first device for display. In some implementations, the first indication of the event is displayed at a web browser of the second device, where the first device is a mobile computing device and the second device can be a desktop computing device. In some implementations, the event can include one or more of: receipt of voice call request at the first device, receipt of a messaging service message at the first device or a change in battery level relative to a predetermined level at the first device. In some implementations, the one or more characteristics of the event include a time at which the event can be received, a type of the event, a priority of the event, or a user account associated with initiation of the event. In some implementations, the first device can be at a first geographic location and the second device can be at a second geographic location.

In some implementations, the first indication of the event, based on the determined characteristics, may not be provided for display to the second device associated with the user account if the determined characteristics do not match the at least one selection criterion. In some implementations, the selection criterion can be matched when the determined characteristics include a low battery warning. In some implementations, the selection criterion can be matched when the determined characteristics include a receipt of a messaging service message from a user contact associated with the user account. In some implementations, the selection criterion can be matched when the determined characteristics include a missed call from a user contact associated with the user account. In some implementations, the selection criterion can be matched when the determined characteristics include a receipt of a messaging service message from a user contact associated with the user account.

Some implementations include detecting an event at a first device associated with a user account, providing a first indication of the event to a server, where when characteristics of the detected event match at least one selection criterion, the server provides the first indication of the event to a second device associated with the user account, receiving a second indication including an action that is to be performed with respect to the event detected at the first device, the second indication generated upon an interaction with the displayed first indication of the event at the second device, and managing the event at the first device based on the action. Some implementations include, receiving first content associated with the first indication of an event and providing the received first content to the server, where the server provides the content to the second device associated with the user account for display with the first indication of the event.

Some implementations include, when the event is initiated from another user account, determining whether an image associated with the other user account is available at the first device, when the image is available at the first device, generating a reference to the image, based on the generated reference, determining whether the image is available at a remote cache, when the image is not available at the remote cache, uploading the image to the remote cache, when the image is determined to be available at the remote cache, and including the generated reference in the first indication of the event provided to the server, where the second device retrieves the image from the remote cache based on the reference.

In some implementations, each cached image can be encrypted with a unique key generated on the first device, prior to transmission to the second device with the first indication of the event. In some implementations, each cached image is encrypted with a content-based key. The content based key can be generated on the first device and transmitted to the second device. In some implementations, a time-to-live (TTL) value may be indicated with the first indication of the event, where the TTL value indicates an expiration time of the first indication.

In some implementations, the second device retrieves the image from the remote cache based on the reference when the image may not be available at the second device. The reference can be a hash value based on the image. Some implementations include receiving second content responsive to the displayed first indication of the event at the second device and displaying the received second content at the first device. The event may include one or more of: receipt of voice call request at the first device, receipt of a messaging service message at the first device or a change in battery level relative to a predetermined level at the first device. Characteristics of the event may include a time at which the event is received, a category of the event, a priority of the event, or a user account associated with initiation of the event. The first device can be at a first geographic location and the second device can be at a second geographic location. In some implementations, the selection criterion can be matched when the determined characteristics include a receipt of a messaging service message from a user contact associated with the user account. The selection criterion can be matched when the determined characteristics include a missed call from a user contact associated with the user account. The selection criterion can be matched when the determined characteristics include a receipt of a messaging service message from a user contact associated with the user account. These examples are not intended to limit the disclosed implementations. In some implementations, the first indication of the event, based on the determined characteristics, may not be broadcasted for display to the second device associated with the user account if the determined characteristics do not match the at least one selection criterion.

Some implementations can receive a first indication of an event detected at a first device associated with a user account, determine one or more characteristics of the event based on the first indication of the event, detect whether the determined characteristics match at least one selection criterion, automatically identify one or more devices associated with the user account, and broadcast the first indication of the event, if the determined characteristics match the at least one selection criterion, to the one or more devices associated with the user account. The provided first indication of the event may be simultaneously displayed, in real time, at the one or more devices to allow management of the event at the first device from any of the one or more second devices. Some implementations may receive a second indication including an action that may need to be performed with respect to the event received at the first device, the second indication generated upon an interaction with the displayed first indication of the event at any of the one or more devices, and transmit the action to the first device, where the event can be managed at the first device based on the action.

Some implementations may, when the action dismisses a notification with respect to the event received at the first device, broadcast the action to the first device and one or more other devices associated with the user account, where the notification is dismissed at the first device and the one or more other devices. The first device can be at a first geographic location and the second device can be at a second geographic location. In some implementations, the selection criterion can be matched when the determined characteristics include a receipt of a messaging service message from a user contact associated with the user account. The selection criterion can be matched when the determined characteristics include a missed call from a user contact associated with the user account.

In some implementations, the first indication of the event, based on the determined characteristics, may not be broadcasted for display to the second device associated with the user account if the determined characteristics do not match the at least one selection criterion. Some implementations can determine whether the first indication of the event detected at the first device associated with the user account is duplicative to one or more previously received indications. When it is determined that the first indication of the event is not duplicative to the one or more previously received indications, broadcast the first indication of the event, to the second device and one or more other devices associated with the user account, and when it is determined that the first indication of the event is duplicative to the one or more previously received indications, some implementations may proscribe the broadcast of the first indication of the event to the second device and the one or more other devices associated with the user account.

Returning to FIG. 1, in certain aspects, server 180 may be implemented using hardware or a combination of software and hardware, either in a dedicated server, or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, the server 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, coupled to bus 124 for storing information and instructions. Server 180 may be coupled via input/output module 128 to various devices. The input/output module 128 can be any input/output module. Example input/output modules 128 include data ports such as USB ports. The input/output module 128 is configured to connect to a communications module 118. Example communications modules 118 (e.g., communications module 118 and 238) include networking interface cards, such as Ethernet cards and modems. In certain aspects, the input/output module 128 is configured to connect to a plurality of devices, such as an input device 116 and/or an output device 114. Example input devices 114 include a keyboard and a pointing device, e.g., a mouse or a trackball, by which a user can provide input to the server 180. Other kinds of input devices 114 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 116 include display devices, such as a LED (light emitting diode), CRT (cathode ray tube), or LCD (liquid crystal display) screen, for displaying information to the user.

According to one aspect of the present disclosure, server 180 can be implemented using a server 180 in response to processor 112 executing one or more sequences of one or more instructions contained in memory 120. Such instructions may be read into memory 120 from another machine-readable medium, such as data storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Server 180 can be, for example, and without limitation, a desktop computer, laptop computer, or tablet computer. Server 180 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method comprising:
   receiving a first indication of an event detected at a first client device associated with a user account;
   determining one or more characteristics of the event based on the first indication of the event;
   detecting whether the determined characteristics match at least one selection criterion;
   identifying a second client device from one or more client devices associated with the user account;
   providing, when the determined characteristics match the at least one selection criterion, the first indication of the event to the second client device associated with the user account, wherein the provided first indication of the event includes a reference to an image, the second client device retrieves the image from a remote cache based on the reference, the provided first indication of the event is displayed as a notification including the image at the second client device to allow management of the event at the first client device from the second client device, and the displayed notification including the image provides a visual indication of a second user account associated with the event, the second user account being different than the user account and associated with a different device than the first client device and the second client device;
   receiving a second indication including an action that is to be performed with respect to the event detected at the first client device, the second indication generated upon an interaction with the displayed notification including the image at the second client device; and
   transmitting the action to the first client device, wherein the event is managed at the first client device based on the action.

2. The method of claim 1, further comprising:
   when the action dismisses the notification with respect to the event received at the first client device, broadcasting the action to the first client device and one or more other devices associated with the user account, wherein the notification is dismissed at the first client device and the one or more other devices.

3. The method of claim 1, further comprising:
   receiving first content associated with the first indication of the event; and
   providing the received first content to the second client device associated with the user account for display with the first indication of the event.

4. The method of claim 3, wherein the second client device retrieves the image for display from the remote cache based on the reference when the image is not available at the second client device.

5. The method of claim 1, further comprising:
   receiving second content responsive to the displayed notification including the image at the second client device; and
   providing the received second content to the first client device for display.

6. The method of claim 1, wherein the first indication of the event is displayed at a web browser of the second client device, wherein the first client device is a mobile computing device and the second client device is a desktop computing device.

7. The method of claim 1, wherein the first indication of the event detected at the first client device comprises a particular notification indicating a battery level of the first client device.

8. The method of claim 7, wherein the event detected at the first client device comprises the battery level of the first client device being below a threshold value, and the second indication comprises an input indicating that the first client device is to be powered down and the action comprises powering off the first client device.

9. A non-transitory machine-readable medium comprising instructions stored therein, which when executed by a processor, causes the processor to perform operations comprising:
   detecting an event at a first client device associated with a user account;
   providing a first indication of the event to a server, wherein when characteristics of the detected event match at least one selection criterion, the server provides the first indication of the event to a second client device associated with the user account, wherein the first indication of the event includes a reference to an image, and the second client device retrieves the image from a remote cache based on the reference and displays a notification including the image, the displayed notification including the image provides a visual indication of a second user account associated with the event, the second user account being different than the user account and associated with a different device than the first client device and the second client device;
   receiving a second indication including an action that is to be performed with respect to the event detected at the first client device, the second indication generated upon an interaction with the displayed notification including the image at the second client device; and
   managing the event at the first client device based on the action.

10. The non-transitory machine-readable medium of claim 9, further comprising instructions stored therein, which when executed by the processor, cause the processor to perform operations comprising:
receiving first content associated with the first indication of the event; and
providing the received first content to the server, wherein the server provides the received first content to the second client device associated with the user account for display with the first indication of the event.

11. The non-transitory machine-readable medium of claim 9, further comprising instructions stored therein, which when executed by the processor, cause the processor to perform operations comprising:
determining that the event is initiated from a different user account;
determining that the image is associated with the different user account and is available at the first client device;
when the image is available at the first client device, generating the reference to the image;
based on the generated reference, determining whether the image is available at the remote cache;
when the image is not available at the remote cache, uploading the image to the remote cache; and
wherein when the image is determined to be available at the remote cache, the generated reference is included in the first indication of the event provided to the server.

12. The non-transitory machine-readable medium of claim 11, wherein the second client device retrieves the image from the remote cache based on the reference when the image is not available at the second client device.

13. The non-transitory machine-readable medium of claim 11, further comprising instructions stored therein, which when executed by the processor, cause the processor to perform operations comprising:
encrypting each cached image with a unique key generated on the first client device, prior to transmission to the second client device with the first indication of the event.

14. The non-transitory machine-readable medium of claim 11, further comprising instructions stored therein, which when executed by the processor, cause the processor to perform operations comprising:
encrypting each cached image with a content-based key, the content-based key generated on the first client device and transmitted to the second client device.

15. The non-transitory machine-readable medium of claim 9, further comprising instructions stored therein, which when executed by the processor, cause the processor to perform operations comprising:
including a time-to-live (TTL) value with the first indication of the event, wherein the TTL value indicates an expiration time of the first indication.

16. A system comprising:
a memory comprising instructions; and
a processor configured to execute the instructions to:
receive a first indication of an event detected at a first client device associated with a user account;
determine one or more characteristics of the event based on the first indication of the event;
detect whether the determined characteristics match at least one selection criterion;
identify one or more client devices associated with the user account;
broadcast the first indication of the event, when the determined characteristics match the at least one selection criterion, to the one or more client devices associated with the user account,
wherein the first indication of the event includes a reference to an image, and at least one client device from the one or more client devices retrieves the image from a remote cache based on the reference and displays a notification including the image, the displayed notification including the image provides a visual indication of a second user account associated with the event, the second user account being different than the user account and associated with a different device than the first client device and the at least one client device, and
wherein the broadcasted first indication of the event is simultaneously displayed, in real time, at the one or more client devices to allow management of the event at the first client device from any of the one or more client devices;
receive a second indication including an action that is to be performed with respect to the event detected at the first client device, the second indication generated upon an interaction with the displayed notification including the image at any of the one or more client devices; and
transmit the action to the first client device, wherein the event is managed at the first client device based on the action.

17. The system of claim 16, the processor further configured to execute the instructions to:
when the action dismisses the notification with respect to the event received at the first client device, broadcast the action to the first client device and the one or more client devices associated with the user account, wherein the notification is dismissed at the first client device and the one or more client devices.

18. The system of claim 16, wherein the first client device is at a first geographic location and a particular second client device is at a second geographic location.

19. The system of claim 16, wherein the at least one selection criterion is matched when the determined characteristics include a receipt of a messaging service message from a particular user contact associated with the user account.

20. The system of claim 16, wherein the at least one selection criterion is matched when the determined characteristics include a missed call from a user contact associated with the user account.

21. The system of claim 16, wherein the first indication of the event, based on the determined characteristics, is not broadcasted for display to a particular second client device associated with the user account if the determined characteristics do not match the at least one selection criterion.

22. The system of claim 16, the processor further configured to execute the instructions to:
determine whether the first indication of the event detected at the first client device associated with the user account is duplicative to one or more previously received indications;
when it is determined that the first indication of the event is not duplicative to the one or more previously received indications, broadcast the first indication of the event, to a particular second client device and the one or more client devices associated with the user account; and
when it is determined that the first indication of the event is duplicative to the one or more previously received indications, proscribe the broadcast of the first indication of the event to the particular second client device and the one or more client devices associated with the user account.

* * * * *